United States Patent
Sudi (10) Patent No.: US 11,034,545 B2
(45) Date of Patent: Jun. 15, 2021

(54) METHOD AND SYSTEM FOR BRAKE TESTING AN ELEVATOR CAR (71) Applicant: OTIS ELEVATOR COMPANY, Farmington, CT (US)

(72) Inventor: Sandeep Sudi, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 204 days.

(21) Appl. No.: 15/935,846

(22) Filed: Mar. 26, 2018

(65) Prior Publication Data
US 2019/0292014 A1 Sep. 26, 2019

(51) Int. Cl.
B66B 5/16 (2006.01)
B66B 5/00 (2006.01)
B66B 1/34 (2006.01)
G01L 5/28 (2006.01)

(52) U.S. Cl.
CPC .......... B66B 5/0093 (2013.01); B66B 1/3461 (2013.01); G01L 5/284 (2013.01); G01L 5/286 (2013.01)

(58) Field of Classification Search
CPC ....... B66B 5/00; B66B 5/0025; B66B 5/0087; B66B 5/0093; B65B 5/0031; G01L 5/284
USPC ................................... 73/121, 129
See application file for complete search history.

(56) References Cited

U.S. PATENT DOCUMENTS

| | | | |
|---|---|---|---|
| 4,568,909 A * | 2/1986 | Whynacht | B66B 5/0037 187/393 |
| 4,898,263 A | 2/1990 | Manske et al. | |
| 6,050,369 A * | 4/2000 | Leone | B66B 1/34 187/280 |
| 6,325,179 B1 * | 12/2001 | Barreiro | B66B 5/0037 187/393 |
| 7,222,698 B2 | 5/2007 | Hanninen | |
| 7,649,450 B2 | 1/2010 | Campion, Jr. et al. | |
| 9,061,864 B2 * | 6/2015 | Spirgi | B66B 5/0037 |
| 2004/0094366 A1 | 5/2004 | Weinberger et al. | |
| 2004/0206583 A1 | 10/2004 | Mearns et al. | |

(Continued)

FOREIGN PATENT DOCUMENTS

| CN | 103420237 A | 12/2013 |
|---|---|---|
| CN | 203319432 U | 12/2013 |

(Continued)

OTHER PUBLICATIONS

European Search Report for application EP 19165336.9, dated Oct. 11, 2019, 7 pages.

(Continued)

Primary Examiner — Eric S. McCall (74) Attorney, Agent, or Firm — Cantor Colburn LLP (57) ABSTRACT A method of testing elevator car braking distance includes verifying that an elevator car is empty. The method also includes initiating a test procedure. The method further includes triggering a safety actuation device to actuate at least one safety brake to stop an elevator car. The method yet further includes recording braking data during a braking period. The method also includes recording braking data with at least one piece of elevator car equipment. The method further includes generating a braking data report that includes at least one of braking distance and braking deceleration of the elevator car.

14 Claims, 5 Drawing Sheets (56) References Cited

U.S. PATENT DOCUMENTS

| | | | |
|---|---|---|---|
| 2009/0133964 A1* | 5/2009 | Ueda | B66B 5/02 |
| | | | 187/254 |
| 2011/0048863 A1* | 3/2011 | Schroeder-Brumloop | ....... |
| | | | B60T 17/22 |
| | | | 187/359 |
| 2012/0217097 A1* | 8/2012 | Jokinen | B66B 5/0087 |
| | | | 187/276 |
| 2014/0284144 A1* | 9/2014 | Schroeder-Brumloop | ....... |
| | | | B66B 5/027 |
| | | | 187/351 |
| 2015/0039258 A1 | 2/2015 | Kattainen et al. | |
| 2015/0329321 A1 | 11/2015 | Hovi et al. | |
| 2017/0197804 A1 | 7/2017 | Kattainen et al. | |
| 2017/0341910 A1 | 11/2017 | Bitzi et al. | |
| 2018/0016117 A1* | 1/2018 | Palazzola | B66B 7/06 |
| 2018/0282122 A1* | 10/2018 | Sudi | B66B 5/0093 |
| 2019/0047819 A1* | 2/2019 | Vaunois | B66B 5/16 |

FOREIGN PATENT DOCUMENTS

| | | |
|---|---|---|
| CN | 104183184 A | 12/2014 |
| CN | 107215729 A | 9/2017 |
| CN | 206466845 U | 9/2017 |
| EP | 3385208 A1 | 10/2018 |
| JP | 2013173599 A | 9/2013 |
| WO | 2014124890 A1 | 8/2014 |
| WO | 2015118064 A1 | 8/2015 |
| WO | 2018015171 A1 | 1/2018 |

OTHER PUBLICATIONS

Chinese Office Action for application CN 201910227396.6, dated Jun. 1, 2020, 9 pages.

* cited by examiner

METHOD AND SYSTEM FOR BRAKE TESTING AN ELEVATOR CAR

BACKGROUND

The disclosure relates generally to elevator systems and, more particularly, to a system and method for automated testing and/or maintenance of such braking systems.

Elevator braking systems may include a safety braking system configured to assist in braking a hoisted structure (e.g., elevator car) relative to a guide member, such as a guide rail, in the event the hoisted structure exceeds a predetermined criteria, such as speed or acceleration, for example. Some braking systems include an electronic safety actuation device to actuate one or more safeties. Safeties and the electronic actuators require periodic testing that is typically performed on site manually by a technician, such as a mechanic, adjustor, or field engineer. Some tests may require a mechanic to visit the top of elevator car to manually measure a safety mark to determine braking distance and to ensure that the car experienced an acceptable deceleration. Often, the mechanic takes pictures in a low lit hoistway and logs them as part of a test report. These tests may not accurately simulate free fall of an elevator cab because the counterweight plays a key role during traditional tests.

BRIEF SUMMARY

Disclosed is a method of testing elevator car braking distance. The method includes verifying that an elevator car is empty. The method also includes initiating a test procedure. The method further includes triggering a safety actuation device to actuate at least one safety brake to stop an elevator car. The method yet further includes recording braking data during a braking period. The method also includes recording braking data with at least one piece of elevator car equipment. The method further includes generating a braking data report that includes at least one of braking distance and braking deceleration of the elevator car.

In addition to one or more of the features described above, or as an alternative, further embodiments may include that the at least one piece of elevator car equipment comprises a camera mounted to the elevator car, the camera taking a picture of brake marks left on a guide rail by the at least one safety brake.

In addition to one or more of the features described above, or as an alternative, further embodiments may include that the safety actuation device is an electronic device for monitoring at least one of velocity and acceleration.

In addition to one or more of the features described above, or as an alternative, further embodiments may include that the safety actuation device comprises an electronic safety actuator.

In addition to one or more of the features described above, or as an alternative, further embodiments may include transferring the generated braking data to an elevator system processing device, wherein the elevator system processing device is at least one of an elevator system controller, a cloud server, and a service tool.

In addition to one or more of the features described above, or as an alternative, further embodiments may include that the at least one piece of elevator car equipment is in operative communication with an elevator car interface board mounted to the elevator car, the interface board in operative communication with the elevator processing device.

In addition to one or more of the features described above, or as an alternative, further embodiments may include that the braking data recorded with the electronic safety actuator comprises at least one of acceleration data and absolute velocity of the elevator car when the safety brake(s) is actuated.

In addition to one or more of the features described above, or as an alternative, further embodiments may include that the test procedure is initiated by an individual located proximate the elevator system processing device, the processing device comprising at least one of an elevator system controller, a cloud server, and any other computing device.

In addition to one or more of the features described above, or as an alternative, further embodiments may include that the individual interacts with the elevator system controller manually with a user interface.

In addition to one or more of the features described above, or as an alternative, further embodiments may include that the individual interacts with the controller with a mobile device in wireless communication with the controller.

In addition to one or more of the features described above, or as an alternative, further embodiments may include establishing a remote connection between a remote device and an elevator system controller, the remote device not located at the location that the elevator system controller is located, wherein the test procedure is initiated by a remote operator that is remotely located relative to the elevator safety brake system and initiates the test procedure with a remote device.

In addition to one or more of the features described above, or as an alternative, further embodiments may include that the remote operator interacts with the remote device and security personnel at the location of the elevator system controller.

In addition to one or more of the features described above, or as an alternative, further embodiments may include that the test procedure is automated and is initiated periodically according to a schedule programmed in the elevator system processing device, the processing device comprising at least one of an elevator system controller, a cloud server, and any other computing device.

In addition to one or more of the features described above, or as an alternative, further embodiments may include calculating the effect of a counterweight during the braking process to determine actual free fall braking data of the elevator car.

Also disclosed is a method of automated testing of elevator car braking distance. The method includes initiating a test procedure with a device. The method also includes triggering an electronic safety actuator to actuate at least one safety brake to stop an elevator car. The method further includes recording braking data with at least one piece of elevator car equipment. The method yet further includes generating a braking data report that includes at least one of a braking distance and braking deceleration of the elevator car.

In addition to one or more of the features described above, or as an alternative, further embodiments may include recording braking data during a braking period with the electronic safety actuator.

In addition to one or more of the features described above, or as an alternative, further embodiments may include that the device that initiates the test procedure comprises at least one of an elevator system controller, a remote device, a cloud server, and any other computing device.

In addition to one or more of the features described above, or as an alternative, further embodiments may include that the at least one piece of elevator car equipment comprises a camera mounted to the elevator car, the camera taking a picture of brake marks left on a guide rail by the at least one safety brake.

In addition to one or more of the features described above, or as an alternative, further embodiments may include that the braking data recorded with the electronic safety actuator comprises at least one of acceleration data and absolute velocity of the elevator car when the safety brake(s) is actuated Further disclosed is an elevator brake testing system including an electronic safety actuator coupled to an elevator car for actuating a safety brake, the electronic safety actuator detecting braking data during a brake test. The system also includes a controller in operative communication with the electronic safety actuator for transferring the braking data. The system further includes a remote device. The system yet further includes a camera operatively coupled to the elevator car, the camera positioned to capture an image of brake marks on a guide rail left by the safety brake. The system also includes a network wirelessly connecting the camera to the controller, and the controller to the remote device, the remote device remotely initiating an automated test of the elevator brake testing system by triggering the electronic safety actuator, the controller communicating an elevator car braking distance to the remote device.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
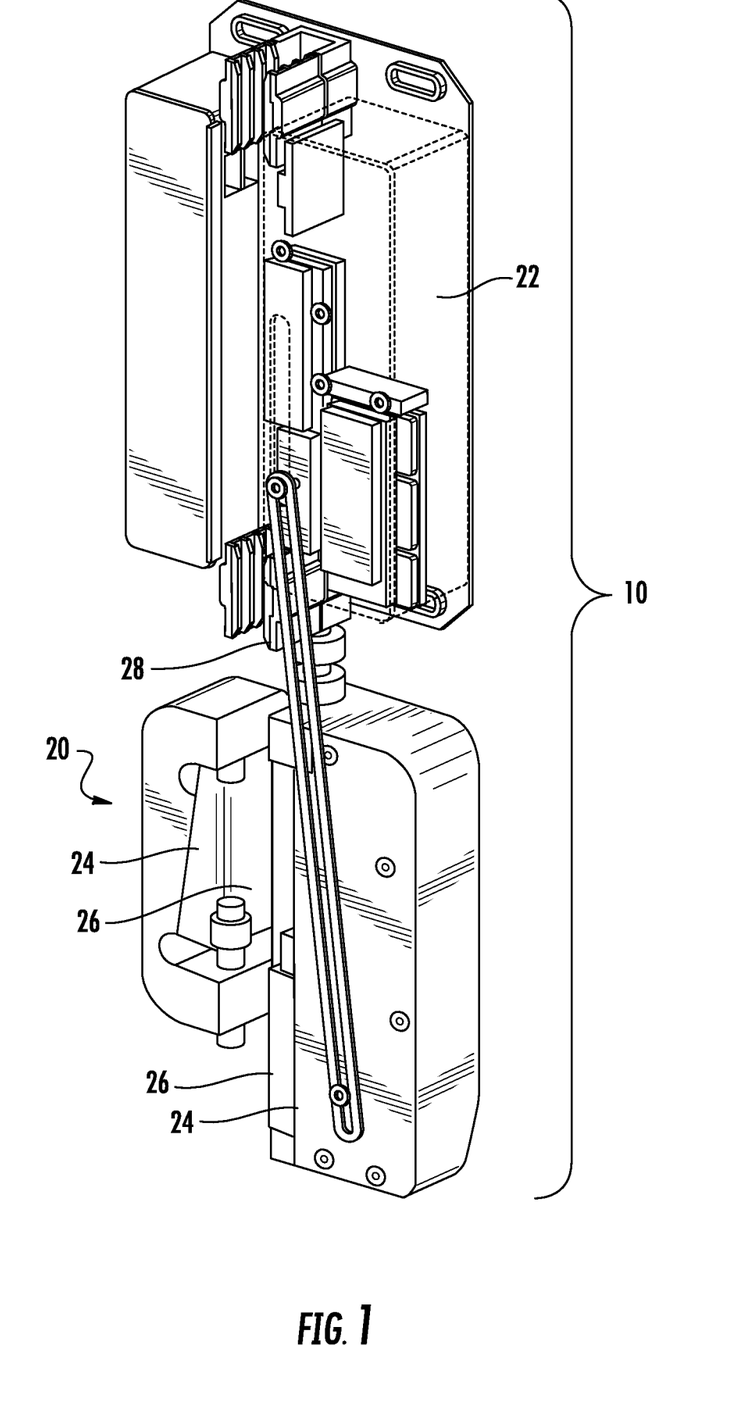
FIG. 1 is a perspective view of an elevator braking system.
Figure 2:
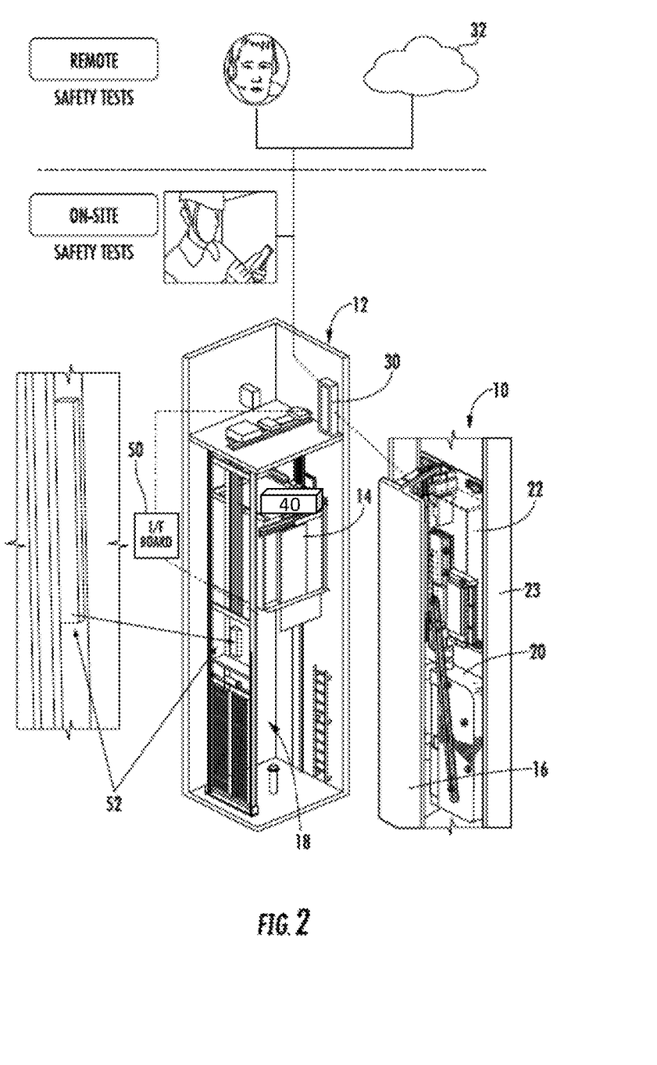
FIG. 2 is a schematic view of an automated elevator brake testing system.

FIGS. 1 and 2 illustrate a brake assembly 10 for an elevator system 12, with FIG. 2 showing the broader elevator system 12 and FIG. 1 depicting an enlarged portion of FIG. 1, specifically the brake assembly 10. The elevator system includes an elevator car 14 that moves through an elevator car passage 18 (e.g., hoistway). The elevator car 14 is guided by one or more guide rails 16 connected to a sidewall of the elevator car passage 18. The embodiments described herein relate to an overall braking system that is operable to assist in braking (e.g., slowing or stopping movement) of the elevator car 14. In one embodiment, the braking is performed relative to the guide rail 16. The brake assembly 10 can be used with various types of elevator systems.

The brake assembly 10 includes a safety brake 20 and an electronic safety actuator 22 that are each operatively coupled to the elevator car 14. In some embodiments, the safety brake 20 and the electronic safety actuator 22 are mounted to a car frame 23 of the elevator car 14. The safety brake 20 includes a brake member 24, such as a brake pad or a similar structure suitable for repeatable braking engagement, with the guide rail 16. The brake member 24 has a contact surface 26 that is operable to frictionally engage the guide rail 16. In one embodiment, the safety brake 20 and an electronic safety actuator 22 may be combined into a single unit.

The safety brake 20 is operable between a non-braking position and a braking position. The non-braking position is a position that the safety brake 20 is disposed in during normal operation of the elevator car 14. In particular, the contact surface 26 of the brake member 24 is not in contact with, or is in minimal contact with, the guide rail 16 while in the non-braking position, and thus does not frictionally engage the guide rail 16. In the braking position, the frictional force between the contact surface 26 of the brake member 24 and the guide rail 16 is sufficient to stop movement of the elevator car 14 relative to the guide rail 16. Various triggering mechanisms or components may be employed to actuate the safety brake 20 and thereby move the contact surface 26 of the brake member 24 into frictional engagement with the guide rail 16. In the illustrated embodiment, a link member 28 is provided and couples the electronic safety actuator 22 and the safety brake 20. Movement of the link member 28 triggers movement of the brake member 24 of the safety brake 20 from the non-braking position to the braking position.

In operation, an electronic sensing device and/or a controller 30 is configured to monitor various parameters and conditions of the elevator car 14 and to compare the monitored parameters and conditions to at least one predetermined condition. In one embodiment, the predetermined condition comprises speed and/or acceleration of the elevator car 14. In the event that the monitored condition (e.g., speed, acceleration, etc.) meets or exceeds the predetermined condition (also referred to as an overspeed or overacceleration condition), the electronic safety actuator 22 is actuated to facilitate engagement of the safety brake 20 with the guide rail 16. In some embodiments, the electronic safety actuator 22 has a velocity sensor and/or an accelerometer. Data is analyzed by the controller and/or the electronic safety actuator 22 to determine if there is an overspeed or overacceleration condition. If such a condition is detected, the electronic safety actuator 22 activates, thereby pulling up on the link member 28 and driving the contact surface 26 of the brake member 24 into frictional engagement with the guide rail 16—applying the brake(s). In some embodiments, the electronic safety actuator 22 sends this data to the elevator controller 30 and the controller sends it back to the electronic safety actuator 22 and tells it to activate.

In an embodiment, two electronic safety actuators 22 (one on each guide rail) are provided and connected to a controller on the elevator car 14 that gets data from the electronic safety actuators 22 and initiates activation of the electronic safety actuators 22 for synchronization purposes. In further embodiments, each electronic safety actuator 22 decides to activate on its own. Still further, one electronic safety actuator 22 may be "smart" and one is "dumb," where the smart electronic safety actuator gathers the speed/acceleration data and sends a command to the dumb one to activate along with the smart electronic safety actuator.

The embodiments described herein conduct automated safety brake testing by utilizing the electronically monitored and controlled electronic safety actuator 22, as well as elevator car equipment 40, such as vibration sensors and/or cameras, that is in operative communication with the controller 30 via an interface board 50 that is operatively coupled to the elevator car 14. The automated safety brake testing ensures that the brake assembly 10 is operating in a desired manner. For example, the testing determines if the brake assembly 10 is stopping the elevator car 14 within a predetermined distance range and at a predetermined deceleration, for example. As shown in FIG. 2, and as will be described in detail herein, in the case of a predetermined distance range, marks 52 left on the guide rail 16 by the safety brake 20 during testing provide a visual indication of the braking distance. Such markings may be remotely viewed and analyzed by images procured with the above-noted camera that is part of the elevator car equipment 40.

The embodiments described above relate to electronic actuation of a safety device. In some embodiments, a governor is utilized to cause a mechanical linkage to lift a safety brake via a rope connecting the governor to the mechanical linkage. The mechanical governor system monitors speed and trips the safety brake if the speed exceeds a predefined percentage of a rated speed. For example, the governor may trip the safety brake if the speed exceeds 115% of the rated speed in some embodiments. The testing procedures described herein in conjunction with the electronic safety actuation embodiments may be utilized with mechanical governor systems. The term "safety actuation device" is used to encompass both the electronic safety actuators and the governor, or any other safety actuation device that is relied upon in an elevator system to trip a safety brake in the event a predefined condition is met or exceeded.

The automated testing is facilitated with wired or wireless communication between the controller 30 and the electronic safety actuator 22, and between the controller 30 and the interface board 50. In one embodiment, the electronic safety actuator 22 and/or the interface board 50 may directly connect over a cellular, Bluetooth, or any other wireless connection to a processing device, such as the controller 30, a mechanic's service tool (such as a mobile phone, tablet, laptop, or dedicated service tool), a remote computer, or a cloud server, for example. As described herein, an elevator brake testing system and an automated method of testing the brake assembly 10 are provided. The testing may be carried out by manual command by an individual located in close or remote proximity to the brake assembly 10 and/or the controller 30. In one embodiment, the testing may be carried out automatically by the controller 30, a cloud server, or other remote computing device. The automatic testing is done periodically according to a schedule programmed in elevator system processing device, such as the controller 30, the cloud server, and/or any other computing device. For example, the automated test may be initiated daily, weekly, monthly, etc., or any other predetermined schedule. The schedule may be based on code requirements, for example.

An individual is considered in proximity to the brake assembly 10 when the individual is able to physically interact with the brake assembly 10 and/or the controller 30. Interaction with the brake assembly 10 and/or the controller 30 may be carried out by manually contacting the structural components, such as with a tool, or may be done with a mobile device that is in wireless communication with the controller 30 directly or through a local network. This is considered on-site testing. In other embodiments, a remote connection is established between the controller 30 and a remote device that is not located at the elevator system 12 location to perform the testing in what is referred to as remote testing. The remote device is connected to the controller 30 via a network 32 or some other remote wireless connection, such as cellular.

Figure 3:
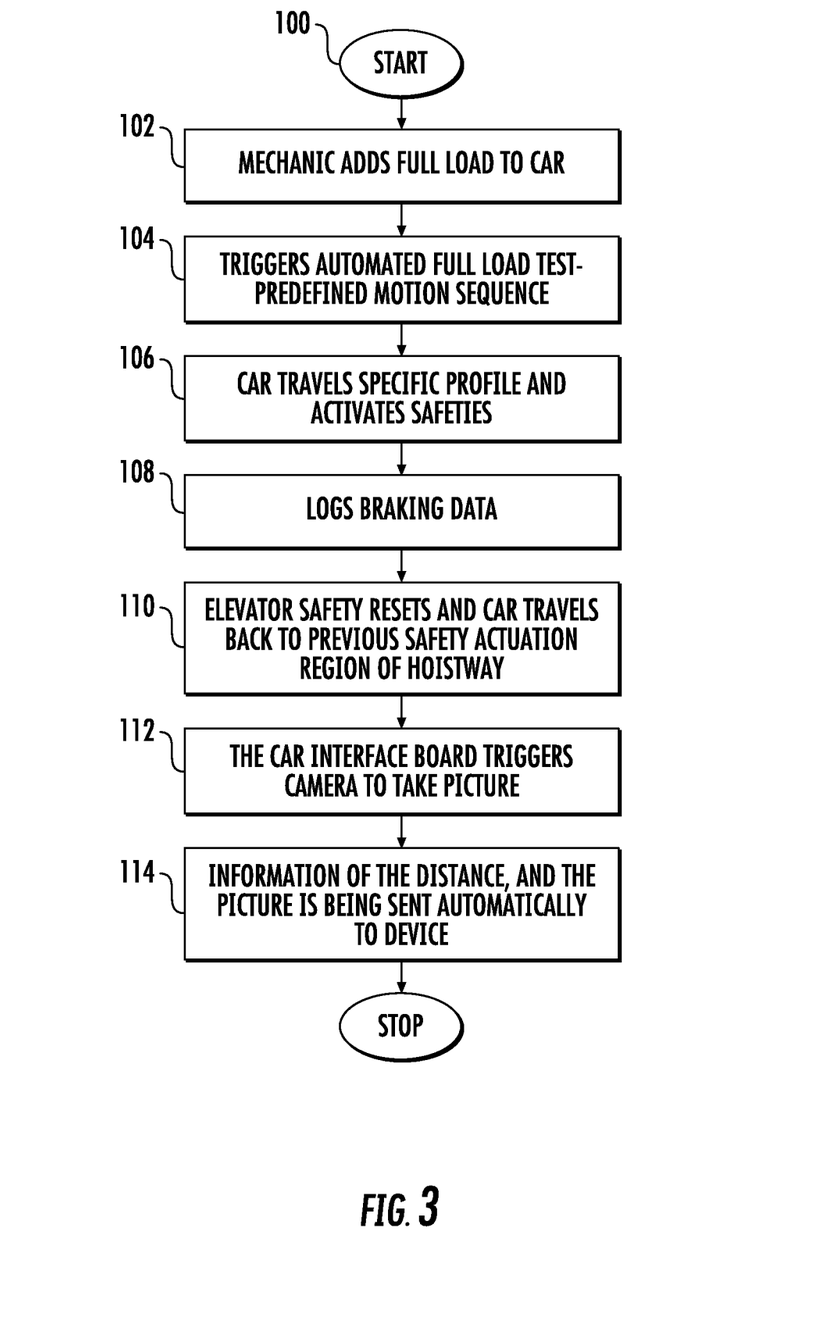
FIG. 3 is a flow diagram illustrating a method of testing of an brake assembly.

Referring now to FIG. 3, a flow diagram illustrates a method of partially automated testing initiated on-site by an individual, such as a mechanic. A test of the brake assembly 10 is initiated at 100 by an individual located proximate the elevator system, as described above in connection with on-site testing. In one embodiment, proximate may mean located anywhere in or near the building in which the elevator system is installed. Initiation may be done by interacting with a user interface, such as a keyboard or touch screen, for example, or with a tool. The on-site testing also verifies that no passenger(s) is in the elevator car. Verification that the elevator car is empty may be done in various ways. For example, in some embodiments a camera viewing an interior of the elevator car 14 is monitored by the individual monitoring the test to determine that the elevator car 14 is empty. In other embodiments, a weight sensor may be utilized to verify a no-load condition. Other methods for verifying that there are no occupants (i.e., passengers) in the car may also be used. Once verification related to the electronic safety actuation device sensors and the no-load condition is made, the elevator system 12 is switched from a normal operating mode to a maintenance mode. In some embodiments, it is desirable to conduct the test in a loaded condition, so a load, such as metal weights, may be added to the elevator car, if needed at 102. The maintenance mode does not allow the elevator car 14 to respond to elevator car requests and limits operation of the elevator car 14 within the system.

Once the elevator car 14 is in the maintenance mode, the fully automated portion of the test is performed upon test initiation by the individual operating the test. During the automated portion of the test, elevator car 14 motion is initiated at 104 according to a predefined motion sequence. Once a defined motion condition is met during the motion test sequence (e.g., overspeed condition), the electronic safety actuator 22 is activated at 106. Activation, or triggering, of the electronic safety actuator 22 actuates the safety brake 20 to decelerate the elevator car 14. During the braking process, braking data is captured by the electronic safety actuator(s) 22 and transferred to the controller, the cloud server, and/or a remote or local mechanic's tool at 108. The braking data is logged during the braking process, with the data including, but not being limited to, acceleration/deceleration data and absolute position velocity of the elevator car 14 when the safety brake(s) 20 engaged the guide rail 16.

The safety brake 20 is reset at 110 in any suitable manner, including by raising the elevator car, and the elevator car 14 travels back to a previous safety actuation region (i.e., initial position) of the elevator car passage 18. Once moved back to the prior safety actuation region, the elevator car's interface board 50 triggers, at 112, the camera 40 to take a picture of the safety marks 52 left on the guide rail 16. The camera 40 may be positioned on top of the elevator car 14 and/or the bottom of the elevator car 14. Movement of the car is dictated by the position of the camera 40 to ensure that the camera is able to capture the relevant safety marks on the guide rail 16. This may be done in infrared light in some embodiments. Information of the braking distance and the picture is sent automatically at 114 to the controller, the cloud server, and/or a remote or local mechanic's tool by the interface board 50.

In some embodiments, the method of partially automated testing is initiated by an individual located remote relative to the elevator system. This may be done with or without the assistance of an on-site mechanic or operator. Alternatively, fully automated testing may be performed. In fully automated tests, testing is initiated by a local device, such as controller 30, or by a remote device, such as cloud server 32.

An automated test of the brake assembly 10 is initiated as part of an automatic service safety routine. Initiation may be based on any given schedule that is programmed in the brake assembly 10, such as in a processing device (e.g., a controller). For example, an automated test may be initiated daily, weekly, monthly or any other specified interval.

The embodiments described herein, the safety brake testing is performed in a partially or fully automated manner. This reduces the personnel required to perform the testing on-site and the time required to conduct the test. In the case of remote testing, the need for a mechanic to travel to and from the pit is avoided and even may be completely eliminated in the case of automated testing. Travel to the top of the elevator car by the mechanic is also eliminated. Additionally, remote and/or automated testing allows for more frequent testing, thereby promoting system operator confidence beyond code requirements. Furthermore, the automated test provides a standardized testing methodology by reducing subjective human analysis.

Figure 4:
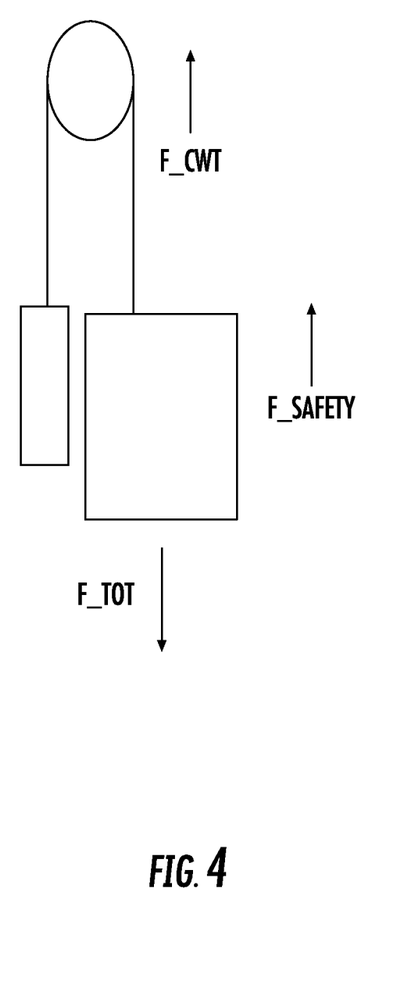
FIG. 4 is a force diagram representing forces associated with the brake testing system.

Referring now to FIG. 4, a force diagram illustrates relevant forces associated with a braking test. In particular, a safety force, F_safety, a counterweight force, F_cwt, are balanced during a braking event by the total downward force of the elevator car, F_tot. In traditional safety tests, the counterweight causes deceleration of the elevator car, thereby assisting the safety brake during the brake test. However, during a true free fall event, the effect of the counterweight is nullified, with the elevator car tending to slide more since the actual deceleration during a true free fall event is less than that observed during a test. In the embodiments described herein, the electronic safety actuator 22 utilizes data from the safety test with the counterweight and simulates a free fall condition and sends critical data the elevator system. In other words, the data obtained provides information about the effect of the counterweight. Therefore, the counterweight effect may be accounted for during testing to nullify the effect to more accurately simulate a true free fall event.

Figure 5:
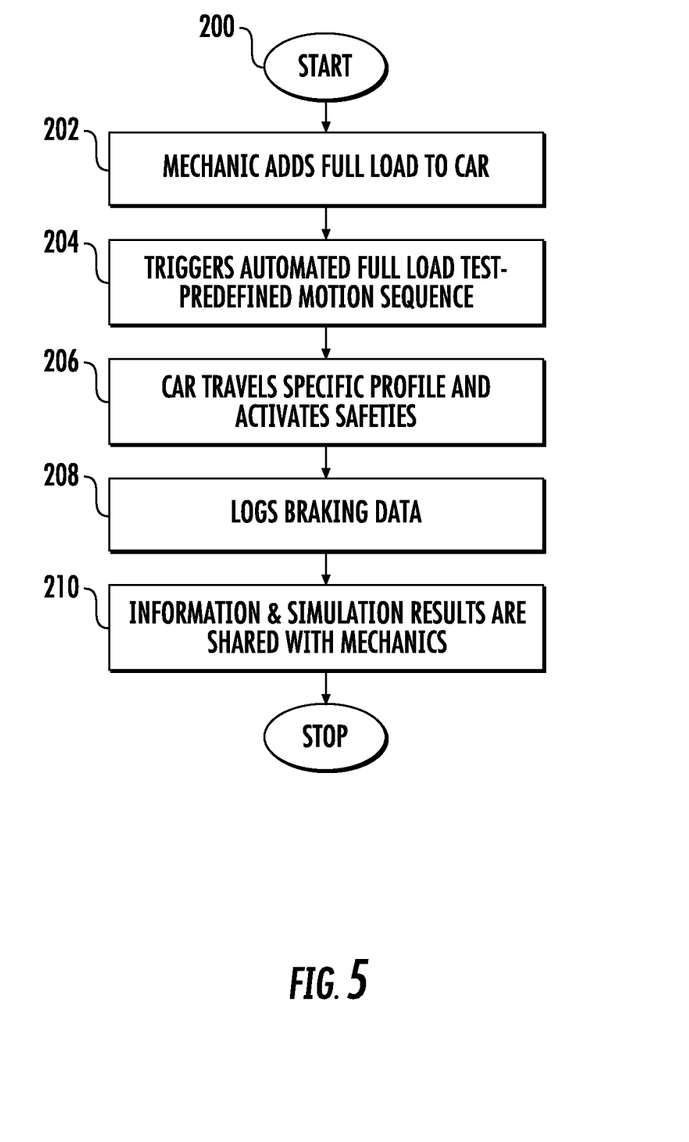
FIG. 5 is a flow diagram illustrating a method of testing the brake assembly according to another aspect of the disclosure.

Referring to FIG. 5, a flow diagram illustrates a method that may be used in conjunction with the method described above and illustrated in FIG. 3. As such, several of the steps associated with the method of FIG. 3 are shown in the embodiment of FIG. 5. It is to be understood that the method of FIG. 5 may be conducted according to any of the partially or fully automated embodiments described above.

As described above, a test of the brake assembly 10 is initiated at 200 with any of the partially or fully automated embodiments. After ensuring that the elevator car is empty, a load, such as metal weights, is optionally added to the elevator car at 202. Elevator car motion is initiated at 204 according to a predefined motion sequence. Once a defined motion condition is met during the motion test sequence (e.g., overspeed condition), the electronic safety actuator 22 is activated at 206. Activation, or triggering, of the electronic safety actuator 22 actuates the safety brake 20 to decelerate the elevator car 14. During the braking process, braking data is captured by the electronic safety actuator(s) 22 at 208. The braking data is logged during the braking process, with the data including, but not being limited to, acceleration/deceleration data, velocity data, and position data of the elevator car 14. At 210, the information and simulation results are shared with the controller, cloud server and/or a remote or local mechanic's tool. The information and results includes collected deceleration data and the effect of the counterweight is quantified. This is then used to calculate the real effect on the elevator car 14 during an actual free fall condition.

In addition to the benefits described above, the methods described herein allow different key conditions, such as free fall cases, to be tested for any electronic safety actuation test. Safety tests can now be done remotely and can be provided to customers as enhanced features.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of testing elevator car braking comprising:
verifying that an elevator car is empty;
initiating a test procedure;
triggering a safety actuation device to actuate at least one safety brake to stop the elevator car, wherein the safety actuation device and the at least one safety brake are mounted to the elevator car;
recording braking data during a braking period in which the at least one safety brake stops the elevator car;
recording second braking data with at least one piece of elevator car equipment; and
generating a braking data report that includes at least one of braking distance and braking deceleration of the elevator car;
wherein the safety actuation device is an electronic device for monitoring at least one of velocity and acceleration;
wherein the at least one piece of elevator car equipment comprises a camera mounted to the elevator car, the camera taking a picture of brake marks left on a guide rail by the at least one safety brake.

2. The method of claim 1, wherein the safety actuation device comprises an electronic safety actuator.

3. The method of claim 2, wherein the braking data comprises at least one of acceleration data and absolute velocity of the elevator car when the at least one safety brake is actuated.

4. The method of claim 1, further comprising transferring the braking data to an elevator system processing device, wherein the elevator system processing device is at least one of an elevator system controller, a cloud server, and a service tool.

5. The method of claim 4, wherein the at least one piece of elevator car equipment is in operative communication with an elevator car interface board mounted to the elevator car, the elevator car interface board in operative communication with the elevator system processing device.

6. The method of claim 1, wherein the test procedure is initiated by an individual located proximate to an elevator system processing device, the elevator system processing device comprising at least one of an elevator system controller, a cloud server, and any other computing device.

7. The method of claim 6, wherein the individual interacts with the elevator system controller manually with a user interface.

8. The method of claim 6, wherein the individual interacts with the elevator system controller with a mobile device in wireless communication with the elevator system controller.

9. A method of testing elevator car braking comprising:
verifying that an elevator car is empty;
initiating a test procedure;
triggering a safety actuation device to actuate at least one safety brake to stop the elevator car;
recording braking data during a braking period;
recording second braking data with at least one piece of elevator car equipment;
generating a braking data report that includes at least one of braking distance and braking deceleration of the elevator car;
calculating the effect of a counterweight during the braking process to determine actual free fall braking data of the elevator car.

10. A method of automated testing of elevator car braking comprising:
initiating a test procedure with a device;
triggering an electronic safety actuator to actuate at least one safety brake to stop an elevator car;
recording braking data with at least one piece of elevator car equipment; and
generating a braking data report that includes at least one of a braking distance and braking deceleration of the elevator car;
wherein the at least one piece of elevator car equipment comprises a camera mounted to the elevator car, the camera taking a picture of brake marks left on a guide rail by the at least one safety brake.

11. The method of claim 10, wherein the device that initiates the test procedure comprises at least one of an elevator system controller, a remote device, a cloud server, and any other computing device.

12. The method of claim 10, further comprising recording second braking data during a braking period with the electronic safety actuator.

13. The method of claim 12, wherein the second braking data recorded with the electronic safety actuator comprises at least one of acceleration data and absolute velocity of the elevator car when the safety brake(s) is actuated.

14. An elevator brake testing system comprising:
an electronic safety actuator coupled to an elevator car for actuating a safety brake, the electronic safety actuator detecting braking data during a brake test;
a controller in operative communication with the electronic safety actuator for transferring the braking data;
a remote device;
a camera operatively coupled to the elevator car, the camera positioned to capture an image of brake marks on a guide rail left by the safety brake; and
a network wirelessly connecting the camera to the controller, and the controller to the remote device, the remote device remotely initiating an automated test of the elevator brake testing system by triggering the electronic safety actuator, the controller communicating an elevator car braking distance to the remote device.

* * * * *